(12) United States Patent
Niu et al.

(10) Patent No.: US 11,677,902 B2
(45) Date of Patent: Jun. 13, 2023

(54) DATA PROCESSING METHOD AND RELATED PRODUCT

(71) Applicant: Shenzhen Corerain Technologies Co., Ltd., Shenzhen (CN)

(72) Inventors: Xinyu Niu, Shenzhen (CN); Kuen Hung Tsoi, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/283,309

(22) PCT Filed: Oct. 9, 2018

(86) PCT No.: PCT/CN2018/109458
§ 371 (c)(1),
(2) Date: Apr. 7, 2021

(87) PCT Pub. No.: WO2020/073193
PCT Pub. Date: Apr. 16, 2020

(65) Prior Publication Data
US 2022/0014705 A1 Jan. 13, 2022

(51) Int. Cl.
*H04N 5/44* (2011.01)
*H04N 21/439* (2011.01)
*H04N 21/44* (2011.01)

(52) U.S. Cl.
CPC .......... *H04N 5/44* (2013.01); *H04N 21/4392* (2013.01); *H04N 21/44004* (2013.01)

(58) Field of Classification Search
CPC .... H04N 19/423; H04N 19/00; H04N 19/176; H04N 19/20; H04N 19/40; H04N 19/436; H04N 19/44; H04N 19/507; H04N 19/61
See application file for complete search history.

(56) References Cited

U.S. PATENT DOCUMENTS

| 7,791,611 B1 | 9/2010 | Holmqvist et al. |
| 2012/0140833 A1* | 6/2012 | Takada ..................... H04N 7/26 375/240.26 |
| 2015/0062134 A1 | 3/2015 | Holland et al. |

FOREIGN PATENT DOCUMENTS

| CN | 101236528 A | 8/2008 |
| CN | 101394349 A | 3/2009 |
| CN | 102929572 A | 2/2013 |

(Continued)

OTHER PUBLICATIONS

International Search Report of PCT/CN2018/019458 dated Jul. 24, 2019.

(Continued)

*Primary Examiner* — Samira Monshi

(57) ABSTRACT

Provided is a data processing system. The system includes a data source, a data receiver, a plurality of source code data frame buffer regions, a data processing module and a state register. The data source is configured to generate a data frame, the data receiver is configured to receive the data frame, and write the data frame into one of a plurality of data frame buffer regions, each of the plurality of source code data frame buffer regions is configured to store a data frame to be processed, the data processing module is configured to perform subsequent processing on data and the state register is configured to store a state of the system and states of the plurality of source code data frame buffer regions.

7 Claims, 3 Drawing Sheets

(56) References Cited

FOREIGN PATENT DOCUMENTS

| | | |
|---|---|---|
| CN | 103260007 A | 8/2013 |
| CN | 103686312 A | 3/2014 |
| CN | 104699627 A | 6/2015 |
| CN | 105681893 A | 6/2016 |
| CN | 108282657 A | 7/2018 |

OTHER PUBLICATIONS

China Patent Application No. 201880083637.8 First Office Action with English translation dated Aug. 12, 2021. 18 pages.
China Patent Application No. 201880083637.8 Second Office Action with English translation dated Feb. 28, 2022. 16 pages.

* cited by examiner

DATA PROCESSING METHOD AND RELATED PRODUCT

CROSS-REFERENCES TO RELATED APPLICATION

This is a National stage application, filed under 37 U.S.C. 371, of International Patent Application No, PCT/CN2018/109458, filed on Oct. 9, 2018.

TECHNICAL FIELD

The present disclosure relates to the technical field of communication and data processing and, in particular, to a data processing method and a related product.

BACKGROUND

In data processing, especially in image processing, along with the rapid development of image processing technology, real-time processing for camera video data has become a rigid demand in many fields. However, with the improvement of performance of an image processing module, a system bottleneck for video processing performance gradually changes to data interaction delay between a video input source and the image processing module.

In related data processing, frame skip may occur in a case of full-frame processing, which affects a result of the data processing.

SUMMARY

The present disclosure provides a data processing method and a related product, and the occurrence of a skip can avoid, thereby improving the accuracy of data processing, and having the advantage of high accuracy.

In a first aspect, a data processing system is provided in embodiments of the present disclosure and includes a data source, a data receiver, a plurality of data frame buffer regions, a data processing module and a state register.

The data source is configured to generate a data frame.

The data receiver is configured to receive the data frame, and write the data frame into one of a plurality of data frame buffer regions.

Each of the plurality of data frame buffer regions is configured to store a data frame to be processed.

The data processing module is configured to perform subsequent processing on data.

The state register is configured to store states of the plurality of source code data frame buffer regions.

In an embodiment, the plurality of data frame buffer regions includes at least three data frame buffer regions.

In an embodiment, the data receiver is specific configured to store the data frame cyclically using the plurality of data frame buffer regions.

In an embodiment, the data frame is a video frame or an audio frame.

In a second aspect, a method for processing data by using the data processing system provided in the first aspect is provided. The method includes the steps described below.

A state N of a register is determined after initializing the data processing system, where $N \leq w-1$, where N is an integer, and w represents a total number of data frame buffer regions.

In response to $N=w-1$, a data frame acquired by a data receiver is written into a $0^{th}$ data frame buffer region, and a buffer address of the $0^{th}$ data frame buffer region is updated into a register.

A data processing module acquires a state of the $0^{th}$ data frame buffer region in the register, extracts data of the $0^{th}$ data frame buffer region and performs subsequent processing.

Optionally, the method further includes the steps described below.

In, response to $N<w-1$, the data frame acquired by the data receiver is written into an $(N+1)^{th}$ data frame buffer region, and a buffer address of the $(N+1)^{th}$ data frame buffer region is updated into the register.

The data processing controller acquires a state of the $(N+1)^{th}$ data frame buffer region in the register, extracts data of the $(N+1)^{th}$ data frame buffer region and performs subsequent processing.

In an embodiment, the data frame is a video frame or an audio frame.

In an embodiment, w is an integer greater than or equal to 3.

In a third aspect, a computer-readable storage medium is provided, which is configured to store a program for interchanging electronic data, where the program causes a terminal to execute the method provided by the second aspect.

BRIEF DESCRIPTION OF DRAWINGS

The accompanying drawings used in description of the embodiments will be described below. Apparently, the accompanying drawings described below illustrate part of embodiments of the present disclosure, and those skilled in the art may obtain other accompanying drawings based on the accompanying drawings described below on the premise that no creative work is done.

DETAILED DESCRIPTION

The solutions in the embodiments of the present disclosure will be described clearly and completely in connection with the drawings in the embodiments of the present disclosure. Apparently, the embodiments described are part, not all, of the embodiments of the present disclosure. Based on the embodiments of the present disclosure, all other embodiments acquired by those of ordinary skill in the art are within the scope of the present disclosure on the premise that no creative work is done.

The terms such as "first", "second", 'third" and "fourth" in the description, claims, and accompanying drawings of the present disclosure are used to distinguish between different objects and not to describe a particular order. In addition, terms "including" and "having" or any variations thereof are intended to encompass a non-exclusive inclusion. For example, a process, method, system, product or device that includes a series of steps or elements not only includes the listed steps or elements but may further optionally include steps or elements that are not listed or inherent to such process, method, system, product or device.

"Embodiment" mentioned throughout the article means that a particular feature, result or characteristic described in the embodiments is included in at least one embodiment of the present disclosure. This phrase occurred in various locations in the specification is not necessarily to refer to a same embodiment, nor is an independent or alternative embodiment that is mutually exclusive from other embodiments. It is explicitly and implicitly appreciated by those skilled in the art that embodiments described herein may be combined with other embodiments.

Figure 1:
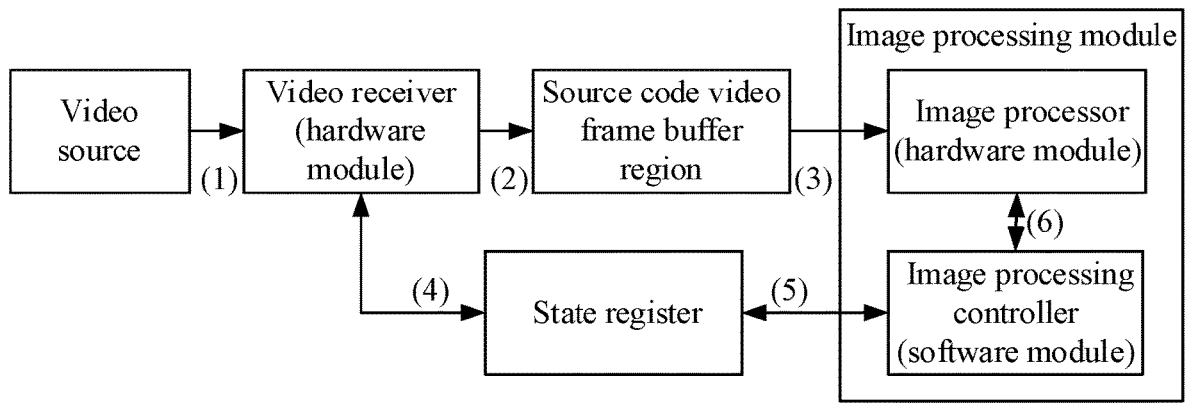
FIG. 1 is a structural diagram of a video processing system.

Referring to FIG. 1, using a video as an example, FIG. 1 is a structural diagram of a video processing system. As shown in FIG. 1, an interactive relationship between modules is the following.

(1) A video receiver reads a video frame from a video source.

(2) The video receiver successfully receives one image frame and writes the one image frame into a buffer region.

(3) An image processor reads the video frame from the buffer region.

(4) The video receiver determines whether to perform the functions (1) and (2) by reading a register, and informs an image processing controller of whether the current buffer region is occupied by writing the register.

(5) The video processing controller determines whether the image processor performs the function (3) by reading the register, and informs the video receiver of whether the buffer region is occupied by writing the register.

(6) Control paths between software and hardware modules inside the image processor.

Figure 2:
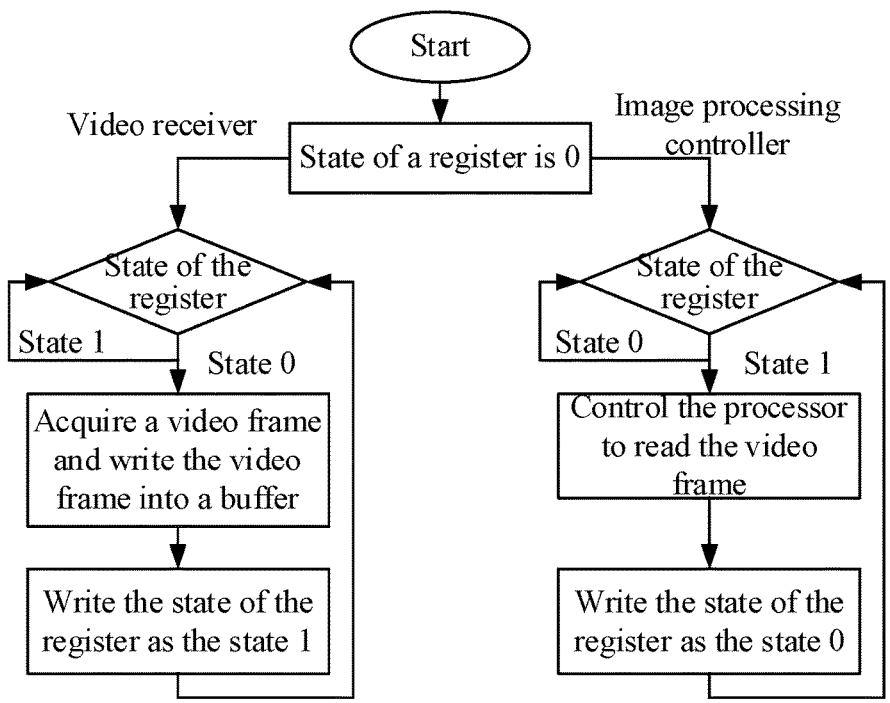
FIG. 2 is a flowchart of a video processing method.

A workflow of a video image processing system shown in FIG. 1 is shown in FIG. 2.

After the video image processing system is initialized, the video receiver determines a state of the register. If the state of the register is 0, a video frame is acquired and written into a buffer, and the state of the register is updated as 1; and if the state of the register is 1, an operation of writing a video frame into the buffer is not performed. The image processing controller determines the state of the register. If the state of the register is 1, the video frame is read, and the state of the register is written as 0; and if the state of the register is 0, an operation of reading a video frame is not performed.

A current working mechanism requires the video receiver and the image processing controller to inform each other of whether the buffer region is being used by reading and writing the register, and the process states of the two parties are coupled and both include the state of determination and wait. However, since the image processing controller is a software module which has a slower speed of writing the register than a hardware module, a certain amount of state update delay may occur. This mechanism has no problem when the speed of image processing is not high, however, when an entire system requires full-frame processing for the video, the software module (i.e., the image processing controller) cannot inform the video receiver to start working in time through the register, thus resulting in the frame skip in the video receiver, and then affecting a result of video processing.

Figure 3:
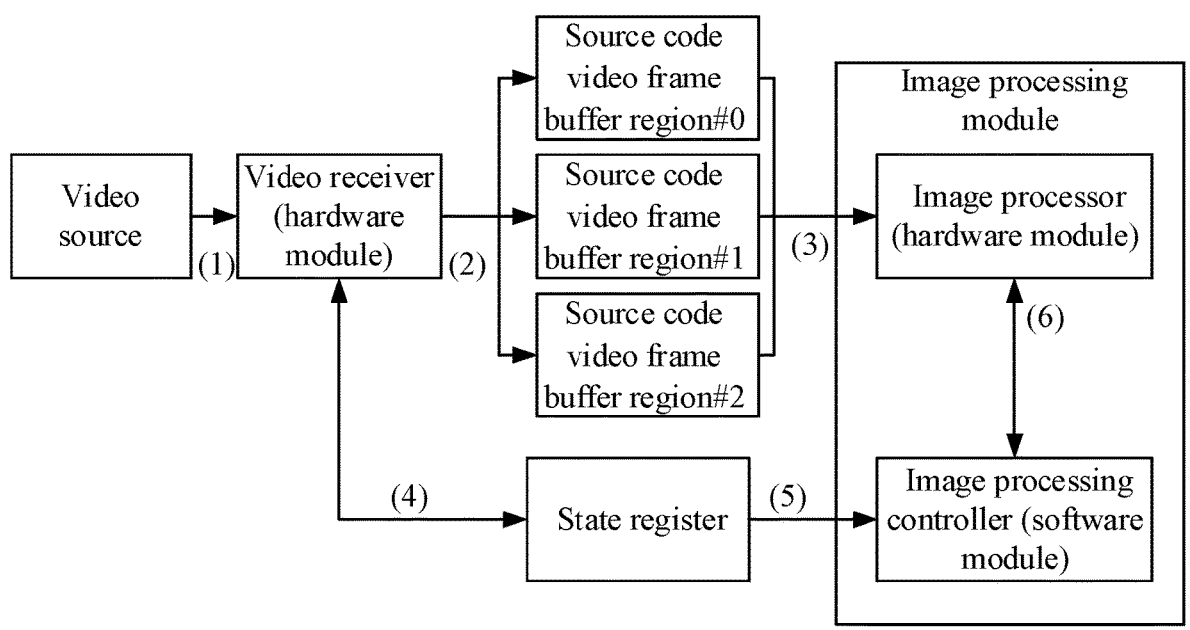
FIG. 3 is a structural diagram of another video processing system.

Referring to FIG. 3, FIG. 3 shows a data processing system, and the data processing system includes a video source, a video receiver, a plurality of source code video frame buffer regions, an image processing module and a state register.

The video source is a module generating video images. The video source may be a data source.

The video receiver is configured to receive a video and write the video into a video frame buffer region. The video receiver may be a data receiver, and each video frame buffer region may be a data frame buffer region.

Each of the plurality of source code video frame buffer regions is configured to store a video frame to be processed.

The image processing module is configured to perform subsequent processing on the image and includes an image processor and a corresponding controller. The image processing module may be a data processing module which includes a data processor and a corresponding controller.

The state register is configured to store states of modules.

A state interaction between system modules has been implemented. An interaction relationship between the modules is the following.

(1) The video receiver reads the video frame from the video source.

(2) The video receiver successfully receives one frame image, writes the one frame image into three buffer regions in turn and performs polling.

(3) The image processor reads the video frame from a corresponding buffer region according to an instruction of the controller.

(4) The video receiver updates a state of the register after acquiring the video frame and writing the video frame into the buffer.

(5) The image processing controller determines a serial number of a buffer region to be read through reading the register.

(6) Control paths between software and hardware modules inside the image processor.

Figure 4:
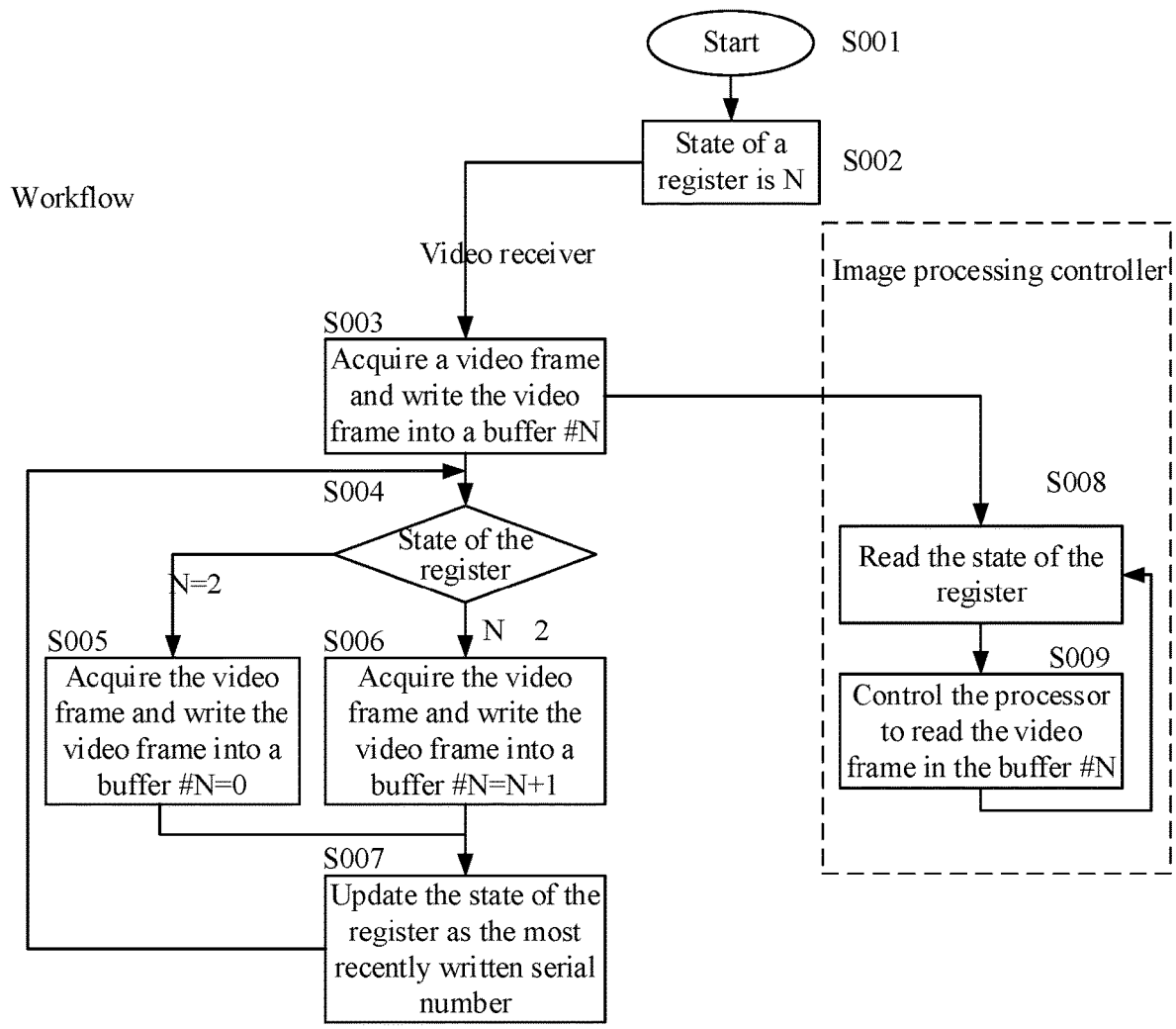
FIG. 4 is a flowchart of another video processing method.

Referring to FIG. 4, using three source code video frame buffer regions as an example to illustrate FIG. 4. The specific structural diagram of the video processing system is as shown in FIG. 3.

In step S001, the system is started and initialized.

In step S002, the current state of the register is N.

In step S003, the video receiver acquires the state of the register, and writes the acquired video frame into an $(N+1)^{th}$ buffer according the current state in the case where N<2, where N is an integer less than or equal to 2.

In step S004, the video receiver determines the state of the register.

In step S005, if the state of the register is 2, the video receiver writes the acquired video frame into a $0^{th}$ buffer.

In step S006, if the state of the register is not 2, the video receiver writes the acquired video frame into an $(N+1)^{th}$ buffer.

In step S007, a buffer address used in step S005 or S006 is updated into the register.

In step S008, the image processing controller reads the state N of the register.

In step S009, according to the state of the register acquired in step S008, the image processing controller controls the image processor to read an image in the $N^{th}$ buffer and use the image for subsequent image processing.

Exemplarily, the above steps are described below by using the case where the state of the register is initially 2 after the system is initialized. In step S001, the system is started and initialized. In step S002, the state of the register is initially 2; in step S004, the video receiver determines that the state of the register is 2; in step S005, in the case where the state of the register is 2, the video receiver writes the acquired video frame into a $0^{th}$ buffer; in step S007, the buffer address used in step S005 is updated into the register, that is, the state of the register is switched from 2 to 0; in step S008, the image processing controller reads the state of 0 of the register; and in step S009, according to the state of 0 of the register acquired in step S008, the image processing controller controls the image processor to read the image in the $0^{th}$ buffer. Returning to step S004, the video receiver determines that the state of the register is 0; in step S006, in the case where the state of the register is 0 which is not 2, the video receiver writes the acquired video frame into a $1^{st}$ buffer; in step S007, the buffer address used in step S005 is updated into the register, that is, the state of the register is switched from 0 to 1; in step S008, the image processing controller reads the state of 1 of the register; and in step S009, according to the state of 1 of the register acquired in step S008, the image processing controller controls the image processor to read the image in the 1$^{st}$ buffer. Returning to step S004, the video receiver determines that the state of the register is 1; in step S006, in the case where the state of the register is 1 which is not 2, the video receiver writes the acquired video frame into a 2$^{nd}$ buffer; in step S007, the buffer address used in step S005 is updated into the register, that is, the state of the register is switched from 1 to 2; in step S008, the image processing controller reads the state of 2 of the register; and in step S009, according to the state of 2 of the register acquired in step S008, the image processing controller controls the image processor to read the image in the 2$^{nd}$ buffer. Then, when the video receiver determines that the state of the register is 2 in step S004, the above steps are repeated. In this way, the three frame buffer regions are cyclically used.

The three buffers may not be numbered strictly by numbers, but merely need to be sorted according to a certain way. The determination logic in S004 is that the three registers are circularly used according to the certain way (for example, three registers are used in the label order, and may also be used in other ways as long as the three registers are circularly used). The number of buffers may be increased according to the scenario and system.

In the present disclosure, the video receiver does not depend on the state of the image processing controller to trigger the next execution, so that in a case of requiring full-frame processing, there is no limitation of frame skip in video acquisition caused by the untimely update of a state register. In the present disclosure, by utilizing a characteristic of a time for acquiring single video frame>>a time for reading an image from a buffer region, a buffer region read-write conflict that may occur after module decoupling is avoided through the polling operation of three buffer regions.

An embodiment of the present disclosure further provides a computer-readable storage medium. The computer-readable storage medium stores a computer program used for interchanging electronic data. The computer program causes a computer to execute part or all of the steps of any one of the data processing methods described in the method embodiments described above.

An embodiment of the present disclosure further provides a computer program product. The computer program product includes a non-transient computer-readable storage medium storing a computer program, and the computer program is operable to cause a computer to execute part or all of the steps of any one of the data processing methods described in the method embodiments described above.

It is to be noted that for simple description, the foregoing method embodiments are all expressed as a series of action combinations. However, those skilled in the art should understand that the present disclosure are not limited by the described action sequences, and according to the present disclosure, some steps may be performed in other sequences or concurrently. It is also to be understood by those skilled in the art that the embodiments described in the specification are optional embodiments and that the actions and modules involved are not necessarily necessary for the present disclosure.

In the embodiments described above, the description of each embodiment has its own emphasis. For a part not described in detail in one embodiment, reference may be made to a related description of other embodiments.

It should be understood that the device disclosed in the embodiments of the present disclosure may be implemented in other ways. For example, the device embodiments described above are merely illustrative. For example, a unit division is merely a logical function division, and, in practice, the unit division may be implemented in other ways. For example, multiple units or components may be combined or may be integrated into another system, or some features may be ignored or not executed. Additionally, the presented or discussed mutual coupling, direct coupling or communication connections may be indirect coupling or communication connections via interfaces, device or units, or may be electrical or in other forms.

The units described above as separate components may or may not be physically separated. Components presented as units may or may not be physical units, i.e., may be located in one place or may be distributed on multiple network units. Part or all of these units may be selected according to practical requirements to achieve the objects of the solutions in the embodiments of the present disclosure.

Additionally, various functional units in each embodiment of the present disclosure may be integrated into one processing unit, or each unit may be physically presented separately, or two or more units may be integrated into one unit. The integrated unit described above may be implemented by hardware or a software program module.

The integrated unit may be stored in a computer-readable memory if implemented in the form of the software program module and sold or used as an independent product. Based on this understanding, the substantial part or the part contributing to the existing art of the solution provided by the present disclosure, or all or part of the solution may be embodied in the form of a software product. The computer software product is stored in a memory and includes several instructions for enabling a computer device (which may be a personal computer, a server, a network device or the like) to execute all or part of the steps in the methods provided by the embodiments of the present disclosure. The preceding memory includes: a USB flash drive, a Read-Only Memory (ROM), a Random Access Memory (RAM), a mobile hard disk, a magnetic disk, an optical disk or another medium capable of storing program codes.

It will be understood by those of ordinary skill in the art that all or part of the steps in the various methods described in the above-mentioned embodiments may be implemented by related hardware instructed by programs, and these programs may be stored in a computer-readable memory which may include a flash disk, a ROM, a RAM, a magnetic disk, an optical disk or the like.

The above describes the embodiments of the present disclosure in detail. The principles and implementations of the present disclosure are described herein with specific examples. The above description of the embodiments is merely for assisting in understanding the method of the present disclosure and its core ideas. At the same time, for those of ordinary skill in the art, according to the idea of the present disclosure, there will be changes in specific implementations and applications. In summary, the content of this specification should not be construed as limiting the disclosure.

What is claimed is:

1. A method for processing data by using a data processing system, comprising:
    determining a state N of a state register after initializing the data processing system which comprises a video source, a video receiver, a plurality of video frame buffer regions, an image processing module and the state register, wherein N≤w−1, wherein N is an integer, and w represents a total number of the plurality of video frame buffer regions; wherein the image processing module comprises an image processor and an image processing controller;

in response to N=w−1, writing, by the video receiver, a video frame acquired from the video source into a $0^{th}$ video frame buffer region, and updating a buffer address of the $0^{th}$ video frame buffer region into the state register; and acquiring, by the image processing controller, a state of the $0^{th}$ video frame buffer region in the state register, and controlling the image processor to extract the video frame in the $0^{th}$ data frame buffer region and perform subsequent processing on the video frame;

in response to N<w−1, writing, by the video receiver, a video frame acquired from the video source into an $(N+1)^{th}$ video frame buffer region, and updating a buffer address of the $(N+1)^{th}$ video frame buffer region into the state register; and acquiring, by the image processing controller, a state of the $(N+1)^{th}$ video frame buffer region in the state register, and controlling the image processor to extract the video frame in the $(N+1)^{th}$ data frame buffer region for subsequent processing.

2. The method of claim 1, wherein w is an integer greater than or equal to 3.

3. A computer program product, comprising a non-transient computer-readable storage medium storing a computer program, and the computer program is operable to cause a computer to execute the method of claim 1.

4. A non-transitory computer-readable storage medium, which is configured to store a program for interchanging electronic data, wherein the program causes a terminal to execute the method of claim 1.

5. The method of claim 1, wherein w is an integer greater than or equal to 3.

6. A computer program product, comprising a non-transient computer-readable storage medium storing a computer program, and the computer program is operable to cause a computer to execute the method of claim 1.

7. A computer program product, comprising a non-transient computer-readable storage medium storing a computer program, and the computer program is operable to cause a computer to execute the method of claim 2.

* * * * *